United States Patent [19]
van der Lely et al.

[11] 4,023,335
[45] May 17, 1977

[54] RAKE MACHINE

[76] Inventors: Cornelis van der Lely, 7, Bruschenrain, Zug, Switzerland; Ary van der Lely, 10, Weverskade, Maasland, Netherlands

[22] Filed: Oct. 11, 1974

[21] Appl. No.: 514,308

[30] Foreign Application Priority Data

Oct. 12, 1973 Netherlands ...................... 7314028
Feb. 18, 1974 Netherlands ...................... 7402172

[52] U.S. Cl. ................................................ 56/370
[51] Int. Cl.² ........................................ A01D 79/02
[58] Field of Search ............ 56/365, 366, 370, 372

[56] References Cited

UNITED STATES PATENTS

| | | | |
|---|---|---|---|
| 2,462,800 | 2/1949 | Berry ..................................... | 56/30 |
| 3,485,019 | 12/1969 | Goble, Jr. et al. ...................... | 56/30 |
| 3,611,690 | 10/1971 | Zweegers ............................... | 56/366 |
| 3,735,573 | 5/1973 | Dziuba .................................. | 56/370 |
| 3,827,224 | 8/1974 | Mulder et al. ......................... | 56/370 |
| 3,841,073 | 10/1974 | van der Lely ......................... | 56/370 |

FOREIGN PATENTS OR APPLICATIONS 1,165,923  7/1960  Germany ............................ 56/370

*Primary Examiner*—Russell R. Kinsey
*Attorney, Agent, or Firm*—Mason, Mason & Albright

[57] ABSTRACT

A raking machine that displaces crop lying on the ground has at least one, preferably two, raking members that rotate on upwardly extending axes. Each raking member has a felly-like or circular member around which tines or other crop gathering elements are displaceably mounted. The circular member can be a cylindrical or conical wall that is deformable or flexible during rotation so that tines secured by pivots or bolts near the bottom of the member can move in axial, radial or tangential directions responsive to ground undulations and/or control means, allowing crop to be deposited in a swath or at a predetermined point along the circumference of the raking member. The circular member can be foldable responsive to the control which can be driven along a track and unfolded to deposit crop as desired. Also, side-by-side raking members can have tines pivoted in assemblies in which crank arms are contacted by control means or elements on an adjacent rake wheel to turn the tines and deposit crop. Similarly, a magnet can be positioned near the felly like member to attract magnets on crank arms and pivot the tines to unload positions. A blower can be used as the control member or a roller support can be placed to distort wire spokes and tine strips, again unloading crop at a preselected site.

30 Claims, 21 Drawing Figures

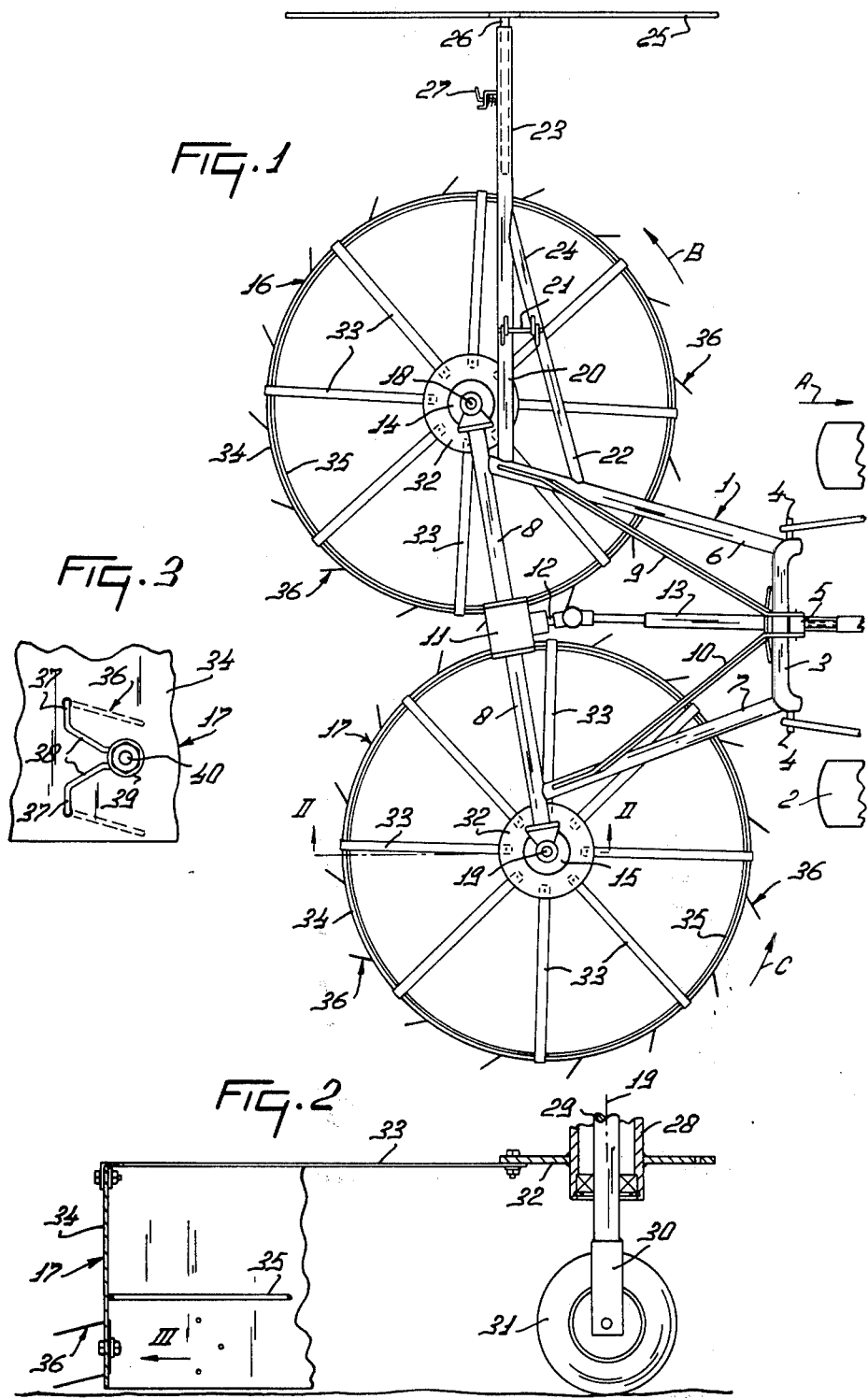

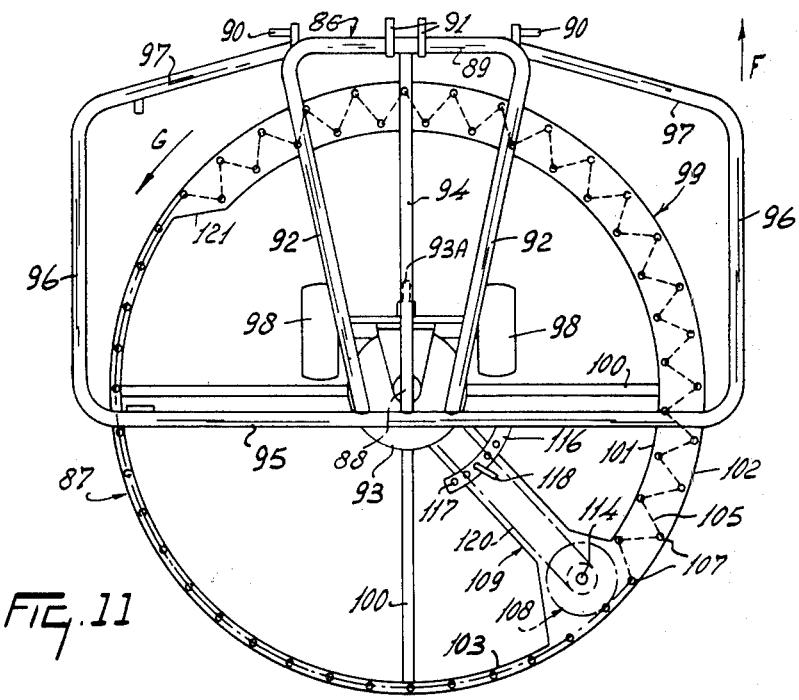
FIG. 11
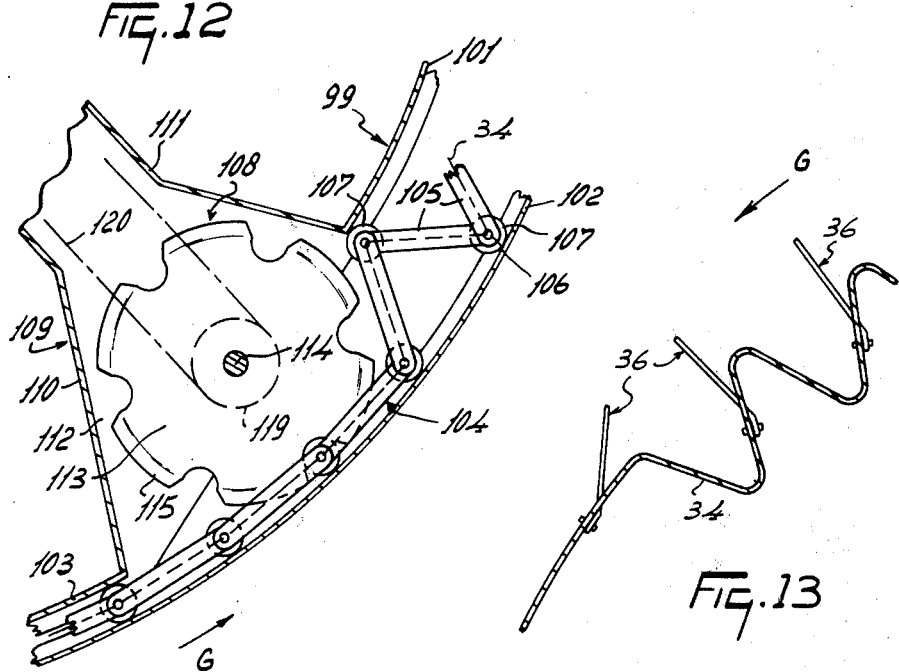
FIG. 12
FIG. 13

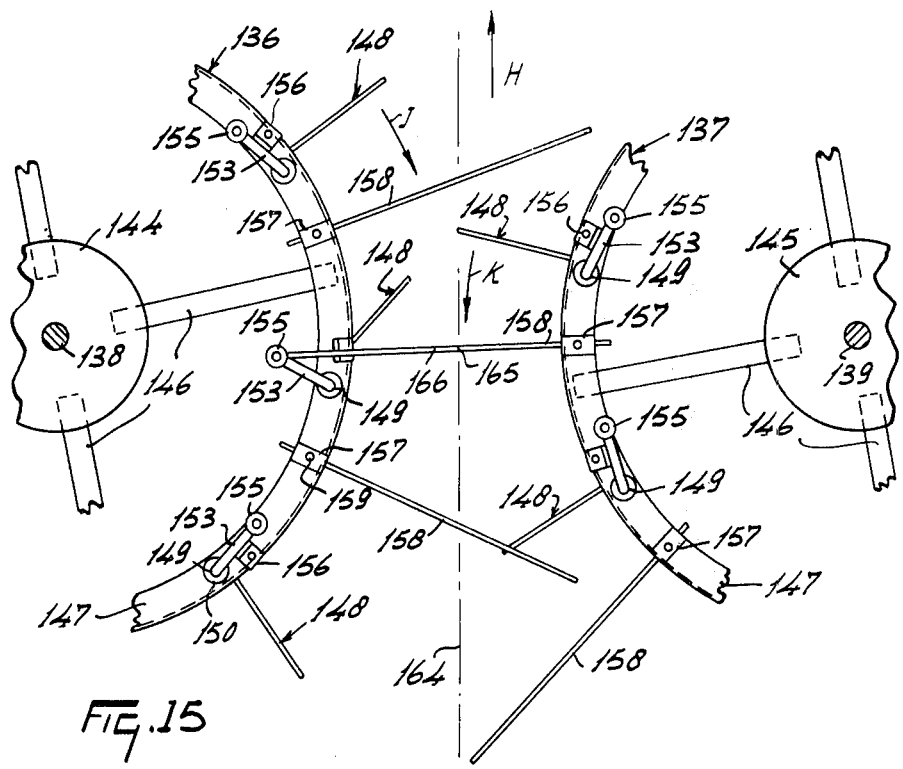
FIG.15
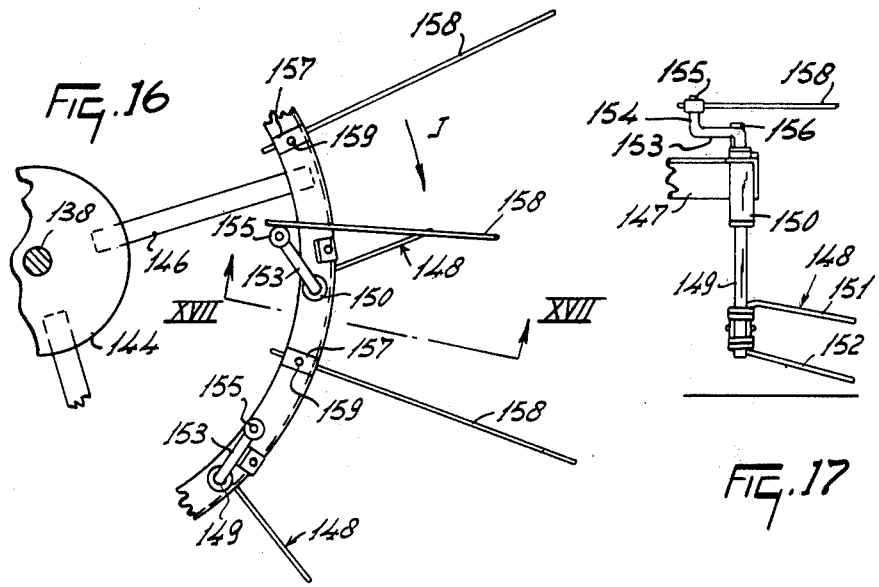
FIG.16
FIG.17

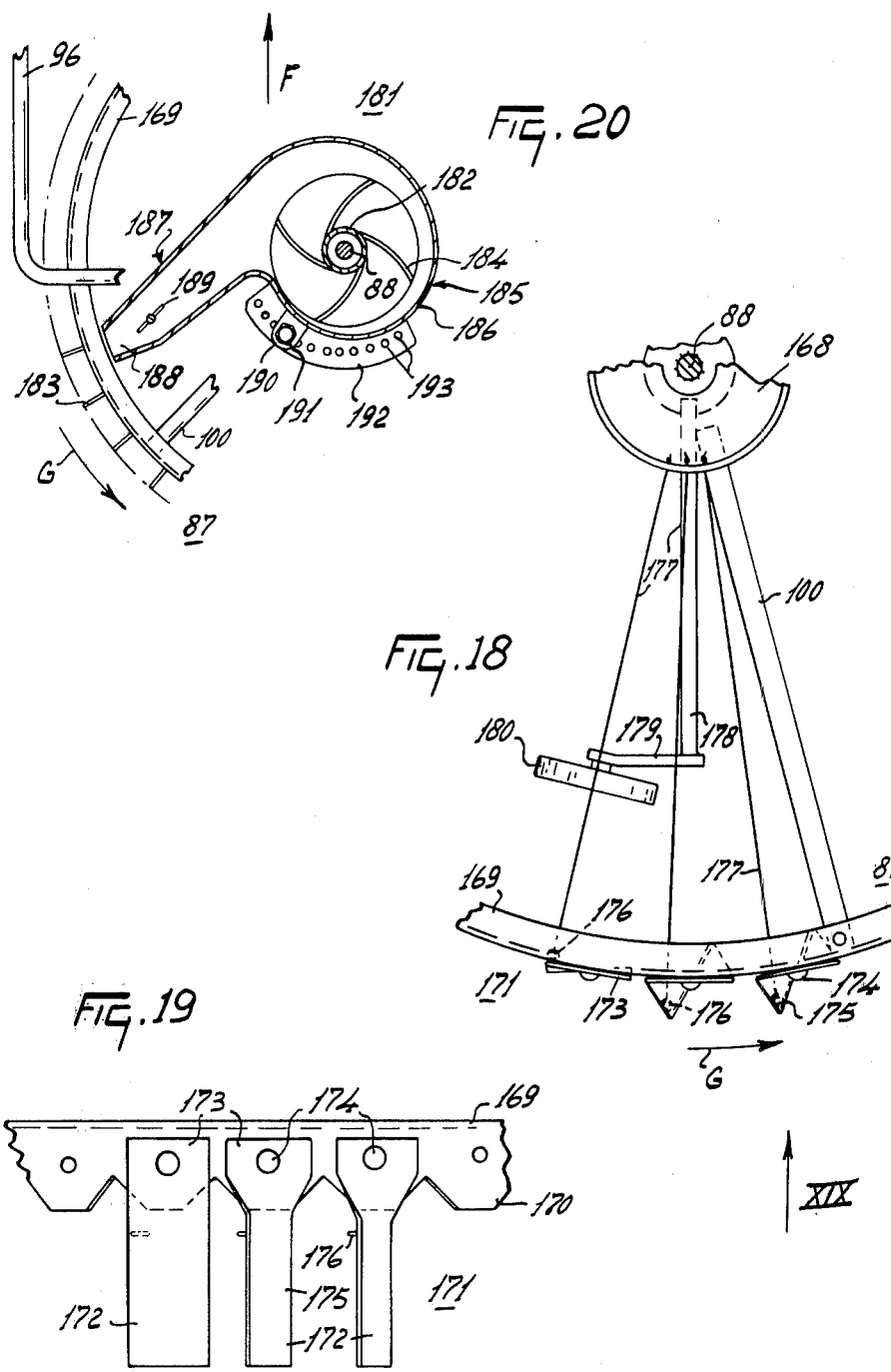

RAKE MACHINE

It is thus possible to obtain a rake member which combines omnidirectional matching of the ground and tine-controlled delivery of crop without the risk of premature or retarded ejection of crop.

For a better understanding of the invention and to show how the same may be carried into effect, reference will be made by way of example to the accompanying drawings.

FIG. 1 is a plan view of a machine embodying the invention attached to a tractor.

FIG. 2 is an enlarged sectional view taken on the lines II—II in FIG. 1 of a rake member in a first embodiment.

FIG. 3 is an elevation in the direction of the arrow III in FIG. 2.

FIG. 11 is a plan view of a further machine in accordance with the invention comprising a rake member having a pliable, flexible wall serving as a crop-displacing means.

FIG. 12 is a plan view with parts shown in section of the circumference of the rake member of the machine shown in FIG. 11.

FIG. 13 is a sectional view of the flexible wall at right angles to the axis of rotation of the rake member shown in FIGS. 11 and 12.

FIG. 15 is a plan view of part of the two rake members located between the two rotary shafts.

FIG. 16 is a plan view of part of one of the rake members of the machine shown in FIGS. 14 and 15 in a position slightly turned with respect to the position shown in FIG. 15.

FIG. 17 is a sectional view taken on the lines XVII—XVII in FIG. 16.

FIG. 18 is a plan view of part of a rake member in a further embodiment.

FIG. 19 is an elevation in the direction of the arrow XIX in FIG. 18.

FIG. 20 is a plan view and partly a sectional view of part of the circumference of a further embodiment of a rake member of the machine comprising an ejecting device.

Figure 4:
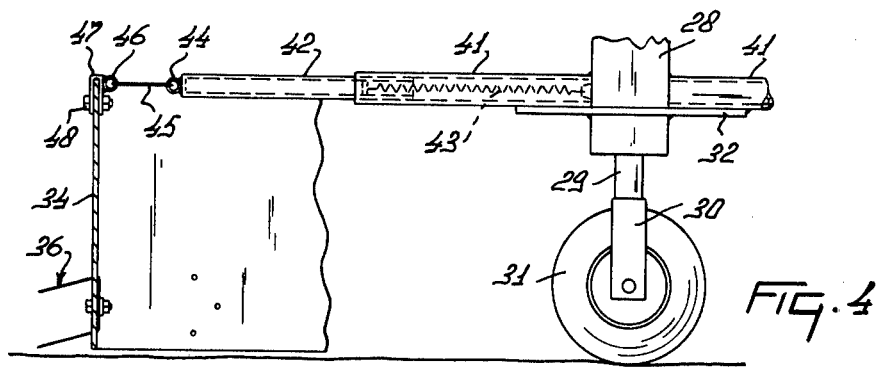
FIG. 4 is a view similar to FIG. 2 of a second embodiment of a rake member.

The machine comprises a frame 1 shown in FIG. 1, having a tubular hitch or trestle 3 adapted to be attached to the lifting device of a tractor 2 and shaped in the form of an inverted U, provided near the two free ends with fastening means 4 for the attachment to the two lower arms of the lifting device of the tractor 2. Near the top of the trestle 3 a fastening means 5 is provided for connecting the trestle 3 with the topmost arm of said lifting device. Near the two fastening means 4 the trestle 3 is provided with two rearwardly diverging, upwardly extending supporting tubes 6 and 7, the tube 6 having a greater length than the supporting tube 7. The two hindmost ends of the supporting tubes 6 and 7 are rigidly secured to a tubular, substantially horizontal frame beam 8, the center line of which is at an acute angle to the line at right angles to the direction of movement A so that, viewed in the direction of movement A, the fastening point of the supporting tube 7 on the frame beam 8. Near the fastening means 5 of the trestle 3 two supporting strips 9 and 10 extend rearwardly in a diverging sense and in operation in a substantially horizontal direction, the rear ends thereof being welded near the rear ends of the supporting tubes 6 and 7.

Approximately at the center of the length of the frame beam 8 a gear box 11 is secured thereto. This gear box comprises a forwardly extending output shaft 12, which is adapted to be connected through an auxiliary shaft 13 with the power take-off shaft of the tractor 2. The gear box 11 comprises a gear wheel transmission and output shafts drivingly connected with two driving shafts. Each of these driving shafts is located inside one of the halves of the tubular frame beam 8 and at the ends remote from the gear box 11 they each drive a set of bevel gear wheels journalled in gears 14 and 15 respectively, which are rigidly secured to the ends of the halves of the frame beam 8 remote from the gear box 11. By means of the latter gear wheel transmissions two rake members 16 and 17 can be driven about upwardly extending rotary shafts 18 and 19 respectively. The rotary shafts 18 and 19 are parallel to one another and vertical, but they may be alternatively arranged parallel to one another in inclined positions so that a higher point of each rotary shaft, viewed on plan, is located in front of a lower point of the same rotary shaft. The rake members shown in FIG. 1, 16 and 17 can be driven by means of the gear wheel transmission in the gear box 11 so that they rotate in the same sense indicated in FIG. 1 by the arrows B and C. Near the rear end of the supporting tube 6 a horizontal support 20 is welded so as to extend transversely of the direction of movement A, the end remote from the tube 6 being provided with a pivotal shaft 21, which extends in operation in a horizontal direction and approximately in the direction of movement A. The pivotal shaft 21 is also journalled in a supporting tube 22, which is rigidly secured to the supporting tube 6 and converges to the support 20 in outward direction. To the pivotal shaft 21 is fastened a tubular extension arm 23 extending in operation in a horizontal direction and in line with the support 21, so that it is also transverse of the direction of movement A. The length of the extension arm 23 is such that in operation it projects at the least over a distance beyond the rake member 16 which is approximately equal to 80 percent of the radius of the rake member 16. The extension arm 23 is furthermore supported from a supporting tube 24, which is rigidly secured to said extension arm and pivoted to the pivotal shaft 21, the disposition being such that in operation it is in line with the supporting tube 22. To the free end of the extension arm 23 is secured a swath board 25, which extends upwardly and approximately in the direction of movement A. To the swath board 25 is secured a setting tube 26, which is transverse of the surface of the swath board 25 and extends over part of its length inside the extension arm 23. The setting tube 26 is axially displaceable in the extension arm 23 and fixable in a plurality of positions by means of a setting member 27 so that the distance of the swath board 25 from the frame 1 can be varied and fixed in a direction at right angles to the direction of movement A. The swath board 25 together with the extension arm 23 and the supporting pipe 24 can furthermore be turned through 180° about the pivotal shaft 21 until it is lying on the frame 1. In this position the swath board 25 is out of operation.

The following description of different embodiments of the machine shown in FIG. 1 applies to the two rake members 16 and 17.

The rake member shown in FIG. 2 comprises a hub 28 adapted to be driven by means of the gear wheel transmission of the gear boxes 14 and 15 respectively. The hub 28 is formed by a hollow tube and rotatably journalled on a rod 29 rigidly fastened, in operation, in the gear box, to which rod is secured a ground wheel 31 by means of a wheel carrier 30. Near the lower end of the hub 28 an annular flange 32 is welded coaxially to the rotary shaft 18 and 19 respectively. At a plurality of places — for example, eight — along the circumference of the flange 32 a plurality of spring steel supports 33 — for example, eight — are fixed at regular intervals to the circumference of the flange 32. The supports 33 may extend in a radial direction but with respect to a radial line going through their fastening point they may be arranged so that their outermost ends are located behind the prolongation of said radial line, viewed in the direction of rotation B or C. The sectional area of said spring steel rodshaped supports 33 is proportioned so that they exhibit a resilient behavior under the action of the forces exerted on the further part of the rake member. The length of a support 33 is such that it covers at least 50 percent, preferably about 80 percent of the radius of the rake member. The ends of the supports 33 remote from the hub 28 hold a felly-like, flexible, uninterrupted wall 34. The supports 33 are fastened near the top side of the wall 34. The wall 34 is shaped approximately in the form of a cylinder, the generatrics of which are parallel to the rotary shaft 18 and 19 respectively. The height of the wall 34, measured in the direction of the rotary shaft 18 and 19 respectively, amounts to 15 to 25 percent of the diameter of the rake member. In practice the height of the wall is preferably about 40 cms.

The wall is preferably made of flexible cloth or stripshaped material of reinforced rubber or synthetic resin, but it may also be made from very light-weight material such as plasticized canvas or a combination of different kinds of substances. The nature of the material should be such that the wall is capable of deflecting locally under the action of the forces exerted thereon, viewed with respect to the hub 28, in a direction parallel to the rotary shaft and also in a radial direction with respect to the surrounding portions of said wall. The lower edge of the wall 34 is located, in operation, near the ground. The connection of the supports 33 with the top edge of the wall 34 can be carried out in a simple manner since the end concerned of each support 33 is provided with an eyelet and bent over through 90° in downward direction so that a bolt can be passed through the eyelet and a hole provided in the top edge of the wall, rings being slipped around the bolt on either side of the wall. The inner side of the wall 34 may, if desired, be stiffened by means of a stiffening rim 35, which is arranged round about on the inner side of the wall 34 and extends parallel to a plane at right angles to the rotary shaft. This stiffening rim is preferably disposed at a distance from the lower edge of the wall 34 equal to 25 to 50 percent of the height of said wall, preferably about 40 percent. The stiffening rim 35 is preferably formed by a spring steel strip having approximately the same flexibility as one of the supports 33, the larger dimension of a section of said strip being parallel to the rotary shaft.

Along the whole circumference at the lower edge of the wall 34 a large number of groups of tines 36 are arranged on the flexible material of said wall. The number of groups of tines equally spaced apart along the circumference of the wall 34 is in this embodiment sixteen. The two tines of each group of tines are located in a vertical plane.

The length of each of the tines of the group is about 10 to 15 percent of the radius of the wall 34, preferably about 12.5 percent of said radius. The tines of each group 36 are in dragging positions relative to the direction of rotation B, C so that they are at an angle of 30° to 60°, preferably about 45° to a radial line going through their fastening point. Their ends are located behind the radial line, viewed in the direction of rotation. With respect to the place where the tines of a group leave the wall 34 the tines extend outwardly in downward direction, the direction of a tine being at an angle of 10° to 30° to the ground surface.

The tines of a group 36 are fastened to the inner side of the wall 34 (FIG. 3). From the area where one of the tines is passed through the flexible wall 34, this tine is bent over out of the aforesaid position on the outer side of the wall 34, in a direction approximately parallel to a generatrix on the inner side of the wall to form a supporting portion 37, whose end remote from the active tine portion is again bent over through an angle of about 100° to 150° to form a supporting portion 38, which is at an angle to a plane at right angles to the rotary shaft and exhibits a curvature which corresponds with the local curvature of the wall. The supporting portion 38 terminates at its end remote from the supporting portion 37 in a portion bent over substantially circularly through almost 360°, which is secured in place by means of a circlip 39 and a bolt 40 passed through a hole in the wall 34. The curved portion located beneath the circlip 39 terminates in a supporting portion 37 holding the other tine of the group 36. The supporting portions 37 and 38 of each group of tines are arranged symmetrically to a plane at right angles to the rotary shaft and going through the center line of the bolt 40. The length of the supporting portion 38 is 2- to 3-times the length of the supporting portion 37. The supporting portions 37 and 38 located on the wall 34 hold the tines of the groups 36 in a vertical and horizontal direction against the forces exerted in operation on the flexible wall. The supporting portions 37 and 38 are, therefore, arranged in front of the fastening bolt 40, viewed in the direction of rotation, when the tines are in dragging positions.

In the embodiment shown in FIG. 4 a number of spokes 41 — for example, six — are fastened, for example, welded rigidly to the flange 32 and if desired to the hub 28 on the top side of the flange 32, said spokes extending in a radial direction. The spokes 41 are formed by rigid tubes parallel to a plane at right angles to the rotary shaft 18 and 19 respectively. Each of the spokes 41 accommodates a tubular extension arm 42, which is axially displaceable in the spoke 41. Near the end of the extension arm 42 on the side of the hub 28 a tension or spring 43 is arranged in the tubular spoke 41, the other end of said spring being fastened to the hub 28. A stop (not shown) prevents the extension arm 42 from slipping out of the spoke 41. The rigidity of the tension or spring 43 is such that a standstill of the rake member the extension arm 42 is almost completely located inside the spoke 41. The length of the spoke 41 is 40 to 60 percent of the radius of the rake member in operation and the length of the extension arm 42 is approximately equal to that of the spoke 41. To the end of the extension arm 42 remote from the hub 28 is fastened by means of an eyelet 44 secured to the extension arm 42, a steel strip 45 so as to be pivotable up and down and in a tangential direction. The end of the strip 45 remote from the extension arm 42 is passed through an eyelet 46 welded to a U-shaped bracket 47, which is fastened by means of a bolt 48 to the top side of the wall 34. The disposition and fastening mode of the group of tines 36 are identical to those described for the embodiments shown in FIGS. 2 and 3.

Figure 5:
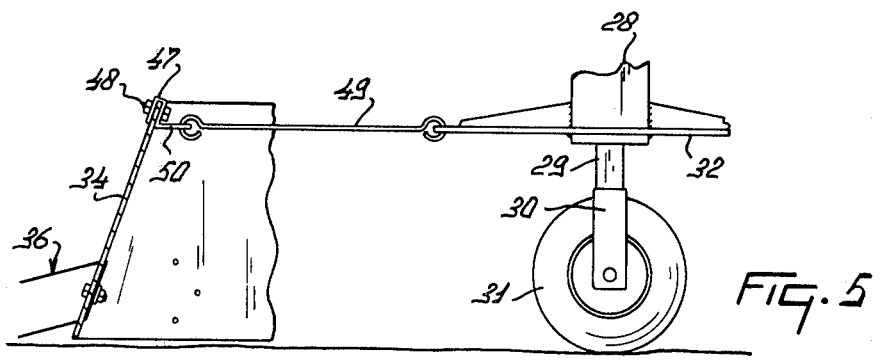
FIG. 5 is a view similar to FIG. 2 of a third embodiment of a rake member.

In the embodiment shown in FIG. 5 the wall 34 is not cylindrical but conical. The wall 34 extends parallel to a conical plane, the apex of which is located above the flange 32 on the rotary axis, while the axis coincides with the axis of rotation and the vertex is about 20° to 40°. The surface of the wall 34 is fastened at the top side by means of a steel strip 49 having eyelets at both ends to the flange 32, which has for this purpose a corresponding number of holes at its circumference, the strip being hooked on the side remote from the hub 28 in a hole provided in a bracket 50 at right angles to the rotary shaft, said bracket 50 being integral with a U-shaped bracket similar to the bracket 47. The web of the latter bracket is located on the top edge of the wall 34 and the limbs thereof are located on either side thereof, while it is fastened by means of a bolt similar to the bolt 48 of FIG. 4. The length of the steel strip 49 is 40 to 50 percent of the largest radius of the wall 34. The pivotable connection of the strip 49 is located directly at the side of the top edge of the wall 34.

Figure 6:
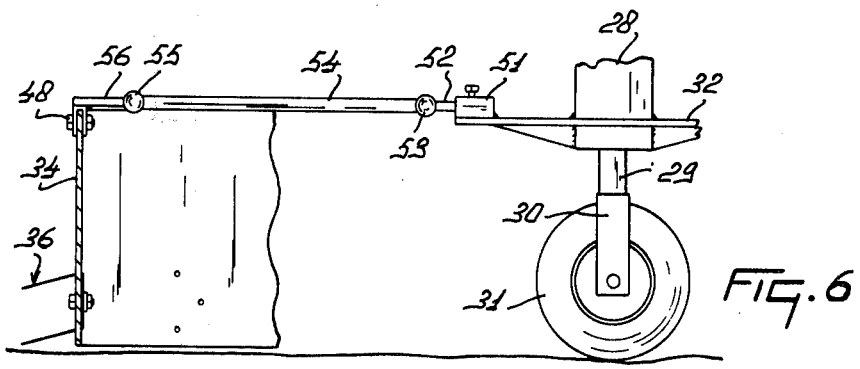
FIG. 6 is a view similar to FIG. 2 of a fourth embodiment of a rake member.

In the embodiment shown in FIG. 6 a plurality of clamping blocks 51 are arranged on the outer edge of the flange 32 for holding short rods 52. At the end of each rod 52 remote from the hub 28 this rod is provided with a ball-and-socket joint 53, which pivotally connects a steel rod 54 with the rod 52, whereas at the other end of the rod 54 a ball-and-socket joint 55 provides an omnidirectional connection between the rod 54 and the rod 56, which extends in operation at right angles to the rotary shaft and is welded to the top side of a bracket, which is similar to the bracket 47 of the preceding embodiments, the bracket connecting the rod 56 on the top side with the wall 34. The length of the rod 54 is 50 to 60 percent of the radius of the wall 34, which is cylindrical in this embodiment. The wall-and-socket joint 55 is located at a very short distance from the wall 54.

Figure 7:
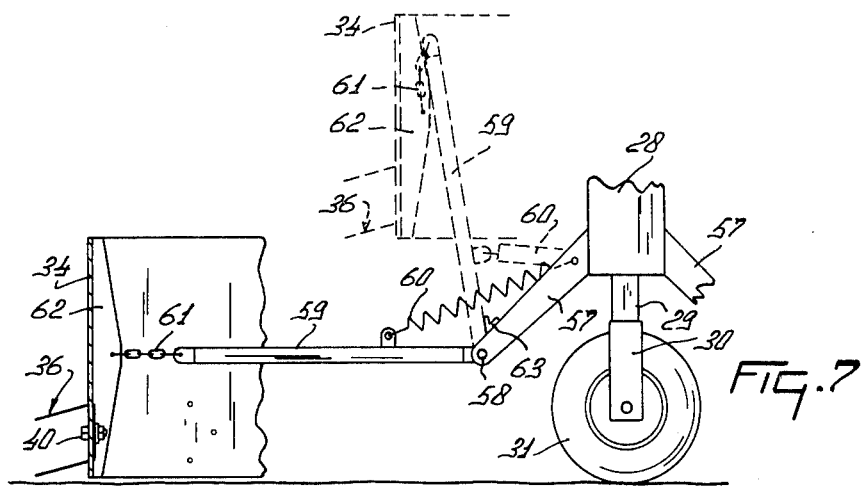
FIG. 7 is a view similar to FIG. 2 of a fifth embodiment of a rake member.

In the embodiment shown in FIG. 7 the hub has fastened to it a plurality of spokes 57, for example, four or six, which are inclined downwardly away from the hub 28 and are at an angle of about 45° to the rotary shafts. Near the end of each spoke 57 remote from the hub 28 a pivotal shaft 58 is arranged so that its center line crosses the rotary shaft at right angles. Viewed in a direction parallel to the rotary shafts 18 and 19 the distance of each pivotal shaft 58 from the rotary shaft is equal to about 20 to 30 percent, preferably about 25 percent of the radius of the flexible wall 34 in operation. To each pivotal shaft 58 is pivoted a rigid, rod-shaped extension arm 59. At approximately equal distances from the pivotal shafts 58 the ends of a tensile spring 60 are fastened to the extension arm 59 and to the corresponding spoke 57 so that the tensile spring 60 tends to turn the extension arm 59 in upward direction with respect to the spoke 57. To the end of the extension arm 59 remote from the pivotal shaft 58 is hooked a flexible connecting member formed by a chain 61, whose end remote from the extension arm 59 is connected with a stiffening strip 62, which extends along a generatrix of the cylindrical wall 34, the strip 62 being fastened at several places along its length to the wall 34. The stiffening strip 62 has essentially the shape of an L, one of the limbs of which is fastened to the wall at several places, whereas the other limb extends radially and provides a fastening point for the chain 61. The fastening point of the chain 61 on the stiffening strip 62 is located, viewed in the direction of the rotary shaft, approximately midway the height of the wall 34. In order to limit the upward movement of the extension arm 59 with respect to the spokes 57, the spoke 57 has a stop 63, which is arranged so that the extension arm 59 can turn upwardly until it is approximately parallel to the rotary shaft.

The rake members described in the foregoing operate as follows. Each of the rake members 16 and 17 are driven through the auxiliary shaft 13, the gear wheels of the gear box 11, the driving shafts journalled in the beam 8 and the gear wheels of the gear boxes 14 and 15 so that in this embodiment the rake members rotate in the same directions B and C. All constructions shown in FIGS. 2 to 7 comprise a flexible wall 34 serving also as a felly for the groups of tines 36 and moving into the working position as a result of centrifugal force. Owing to this centrifugal force the supports 33 (FIG. 2), the strips 49 (FIG. 5) and the rods 54 (FIG. 6) will adjust themselves approximately at right angles to the rotary shaft. In the construction shown in FIG. 4 each tensile spring 43 is stretched by the outwardly moving mass of the wall 34 and the extension arm 42. The position of the extension arm 42 with respect to the associated spoke 41 is determined in operation by the state of equilibrium, in which the tensile force of the springs 43 equals the centrifugal force. The strip 45 will adjust itself also approximately at right angles to the rotary shaft under the action of the centrifugal force exerted on the wall 34. In the embodiment shown in FIG. 7 the extension arm 59 turns about the pivotal shaft 58 with respect to the spoke 57 until the extension arm 59 is approximately at right angles to the rotary shaft. The spring 60 essentially serves for absorbing the mass of the wall 34, the strips 62, the chains 61 and the extension arms 59 when the rake member is standing still.

Since the flexible wall 34 moves in a rotary movement along the ground in the direction of travel A, the lower side of the wall rotating about a vertical axis, which is located throughout its circumference at least in this embodiment immediately above the ground, will displace the crop in the direction of rotation B, C, the lower edge of the wall 34 sliding along the ground in a linear and simultaneously rotary movement. It should be noted that the flexible wall 34 itself is in the first place a crop-displacing member. Apart from the displacement of the crop during the linear movement of the wall 34 in the direction A by the lower edge of the wall 34, it may be important to intensify the engagement of the outer surface of the wall 34 with the crop. Since the whole outer surface of the wall 34 participates in the displacement of the crop, it has to be provided, as far as it will come into contact with the crop, with means in the form, for example, of unevennesses so that the outer surface of the wall can better engage the crop. With a view to this function the lower part of the outer surface of the wall 34 is provided with a large number of extensions, formed in this case by groups of fairly short tines. It should be noted that extensions in the form of tines are not absolutely necessary in order to obtain the desired displacement of the crop; it may also sufficie to provide a large number of extensions formed by a radial, flat plate, whereas they may also be formed by blades.

The use of extensions on the whole circumference of the outer surface of the wall 34 coming into contact with the crop increases the shifting effect of the wall itself on the crop. In the machine shown in FIG. 1 the wall 34 of the rake member 17 will displace the crop towards the rake member during its movement along the ground in the direction of movement A and its rotary direction C, to which the increased engagement of the wall 34 with the crop contributes, which is obtained by the extensions, in this case the groupds of tines 36. It appears that the length of the tines may be fairly small as compared with the conventional length of tines of known cyclic hay-making machines.

The crop shifted by the rake member 17 between the two rake members 16 and 17 is again shifted by the wall 34 of the rake member 16 with its groups of tines 36 in the direction of rotation B towards the swath board 25. It is found that when the wall moves away from the swath board 25 owing to the rotation in a direction at right angles to the direction of movement A the crop is locally released without the need for further means, particularly when the tines are in dragging positions, so that the crop is deposited on a strip bounded by the swath board 25 and the nearest point of the wall 34 of the rake member 16. The machine shown in FIG. 1 is found to yield results similar to those of a side-delivery rake.

Since the wall 34 is flexible in the direction of the rotary shaft 18 and 19 respectively and in a radial direction, the lower side of the wall 34 shifting the crop along and around can match the unevennesses of the ground under any condition and, which is very important, it is capable of immediately matching the further shape of the ground without leaving the ground, so that the crop is always carried along. Owing to the resilient supports 33 (FIG. 2), the strips 45 (FIG. 4), the strips 49 (FIG. 5) and the rods 54 (FIG. 6) the wall can move as a whole with respect to the rotary shaft. The wall 34 need not shift in place in an axial direction, it may tilt as a whole about the rotary shaft owing to a force exerted eccentrically somewhere on the lower edge of the wall 34. Since the wall 34 itself is flexible, local deformations may readily occur when passing across obstacles, in which case a part of the wall can fold up with respect to the surrounding portions, while the wall can deflect from the cylindrical or conical shape assumed by centrifugal force. Owing to the omnidirectional adaptability and to the stabilizing centrifugal force stretching the wall into the cylindrical or conical shape and stabilizing the same with respect to the rotary shaft, the undisturbed shape is re-assumed immediately after the performance of the relative movements and deformations of the wall, the lower edge of the wall never leaving the ground so that no crop is left behind.

The construction shown in FIG. 7 is a preferred embodiment, since the wall 34 is fastened midway its height measured in the direction of the generatrics, which ensures a favorable stable state of the wall in operation. When encountering obstacles the wall can deflect as a whole owing to the flexible suspension by means of the chains 61 and because the extension arms 59 can readily turn about the pivotal shafts 58. In this embodiment the lower part of the wall 34 can readily match the unevennesses of the ground in the manner described above and this may even be further improved by omitting the lower part of the stiffening strips 62 while maintaining the spot of application of the chain 61 so that the flexible behavior of the lower edge of the wall 34 is ensured at any area of its circumference. For the same reason the flexible stiffening rim 35 (FIG. 2) is arranged above that portion of the outer surface of the wall 34 which comes into contact with the crop. In this way excessive folding of the wall surface, when constructed from very light-weight and thin material, can be avoided. The embodiments depicted are suitable not only for obtaining the desired raking effect by rake members rotating in the same sense but also by rake members rotating in opposite senses and by a single rake member.

When the rake members 16 and 17 are put out of operation, they are lifted by the lifting device of the tractor 2 prior to or during stopping of the drive. The wall 34 shown in FIG. 2 will occupy approximately the same position after being lifted as in operation, the supports 33 being, however, slightly bent by the weight of the wall 34. In the construction shown in FIG. 4, after the drive has been stopped, the tensile springs 43 tend to draw the extension arm 42 towards the hub 28 so that the diameter of the rake member is reduced approximately by half, while after the rake member has been lifted the strips 45 will hang down with respect to the extension arms 42 so that the upper edge of the wall 34 will be located beneath the spokes 41, the flexible wall 34 being then strongly folded. When the rake member shown in FIG. 5 is lifted, the strips 49 will hang down approximately perpendicularly with respect to the flange 32 so that the wall 34 folds up strongly and a considerable reduction of the diameter of the rake member can be obtained. The same applies to the rods 54 hanging down in transport as shown in the embodiment of FIG. 6. When the rake member shown in FIG. 7 is lifted and the drive is stopped, the extension arm 59 will turn upwards under the action of the tensile spring 60 approximately into the position indicated by broken lines. The chains 61 will hang down from the end of the extension arm 59 remote from the pivotal shaft 58. Also in this case the diameter of the rake member is drastically reduced, while the wall 34 does not hang on the lower side of the rake member, since the wall is moved in this case in upward direction with respect to the hub 28 into the transport position, the wall itself folding up again.

Particularly the constructions shown in FIGS. 4 to 7 are highly suitable for use in a machine comprising a plurality of rake members, since these constructions have the advantage that at a standstill of the rake member an appreciable reduction of the diameter of the rake member is obtained so that in transport the overall width of the machine can be materially reduced. These advantages apply, of course, also to machines comprising one rake member, whose dimensions are such that in operation it extends beyond the width of the tractor.

The mode of fastening of a group of tines 36 as shown in FIG. 3 to the wall 34 is particularly intended to obtain an optimum stability of the group of tines with respect to that portion of the flexible wall which is located in the near vicinity of the group of tines 36. The supporting portions 37 and 38 are, therefore, arranged on the inner side of the wall 34 so that when the tines are loaded said portions are urged against the inner side of the wall 34, while the dispersed disposition of the supporting portions 38 and the upwardly extending supporting portions 37 provide a hold to the group of tines both in a vertical and a horizontal direction, so that when loaded the group of tines cannot deflect.

Figure 8:
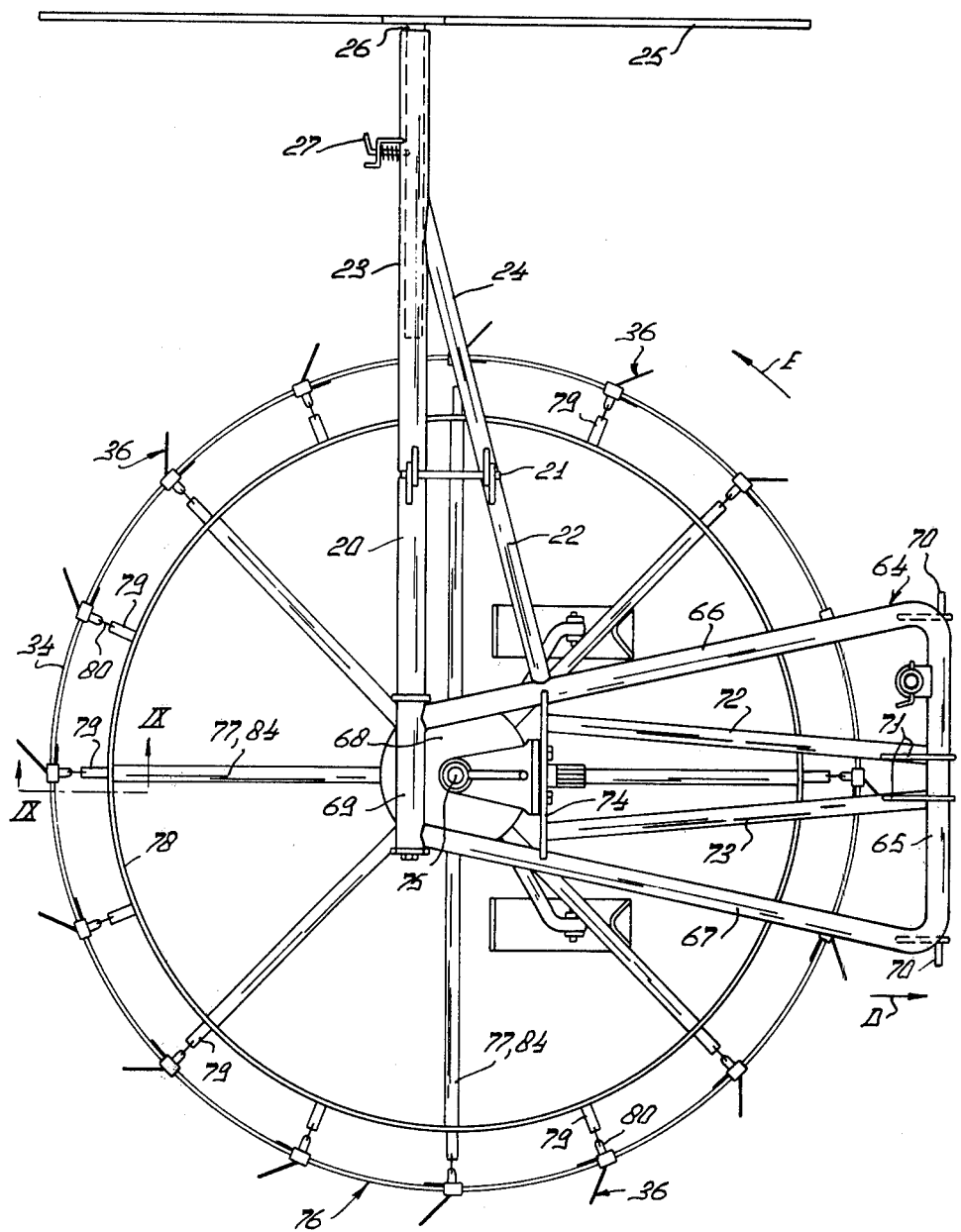
FIG. 8 is a plan view of a further machine in accordance with the invention.

The machine shown in FIG. 8 comprises a frame 64 of substantially triangular shape, viewed on plan, the apex of the triangle being located after the base of this isosceles triangle, viewed in the direction of travel D, while the base of the triangle extends transversely of the direction of travel D. This base is formed by a trestle 65 in the form of an inverted U, whose ends both terminate in rearwardly converging supporting tubes 66 and 67, which are connected with one another near their rear ends and, moreover, with the rear part of a gear box 68. The rear ends of the supporting tubes 66 and 67 are interconnected by a horizontal, transverse extension arm 69, in line with which there is arranged a swath board structure 25 corresponding with the construction shown in FIG. 1 so that corresponding parts are designated by the same reference numerals. The U-shaped trestle 65 is provided near its lower ends with fastening means 70 for the attachment of the machine to the lower arms of the lifting device of the tractor 2, while near its upper point the trestle 65 has fastening means 71 for attachment to the top arm of the lifting device. Away from the fastening means 71 two tubular pull rods 72 and 73 extend diverging to the rear in downward direction, their rear ends being secured to a supporting plate 74 extending transversely of the direction of travel D and serving in addition for supporting the gear box 68 at the front. The gear box 68 holds a rotary shaft 75 extending vertically in operation, a rake member 76 being rotatably fastened to said shaft.

Figure 9:
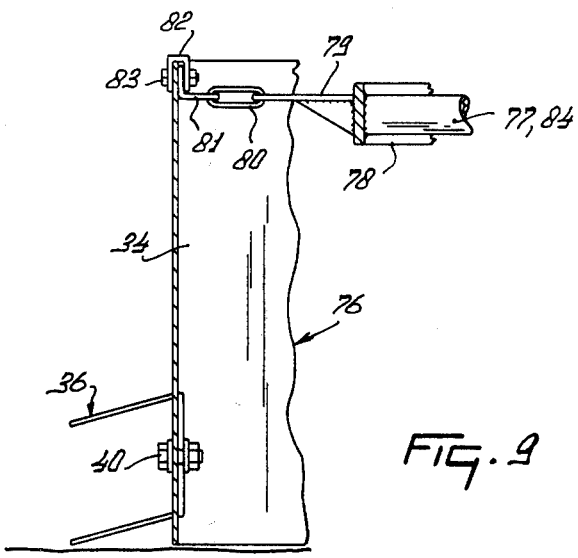
FIG. 9 is a sectional view taken on the lines IX—IX in FIG. 8 of a first embodiment of the associated rake member.

A hub 68A of the rake member 76 located beneath the gear box 68 is provided with a plurality of spokes 77 — in this case, eight — which are rigidly secured to said hub and extend in a radial direction, viewed on plan. The ends of the spokes 77 remote from the hub of the rake member 76 are interconnected by a felly 78 which is coaxial to the rotary shaft 75 and is made of strip material of rectangular section, the major dimension of the section extending parallel to the rotary shaft 75 (FIG. 9). Near the outermost end of each spoke 77 the felly 78 has rigidly secured to it an extension arm 79, which is in line with the spoke 77. The end of the extension arm 79 remote from the spoke 77 has a hole for receiving a link 80, whose other end is fastened to an L-shaped bracket 81, the upright limb of which is in contact with the upper edge of the wall 34, while a U-shaped bracket 82 whose limbs are located on the sides of the wall 34 and on the sides of the upright limb of the bracket 81, is clamped tight by a bolt. The groups of tines 36 are arranged in the same manner and have the same dimensions as indicated for the preceding embodiments and the mode of fastening is similar to that shown in FIG. 3.

Figure 10:
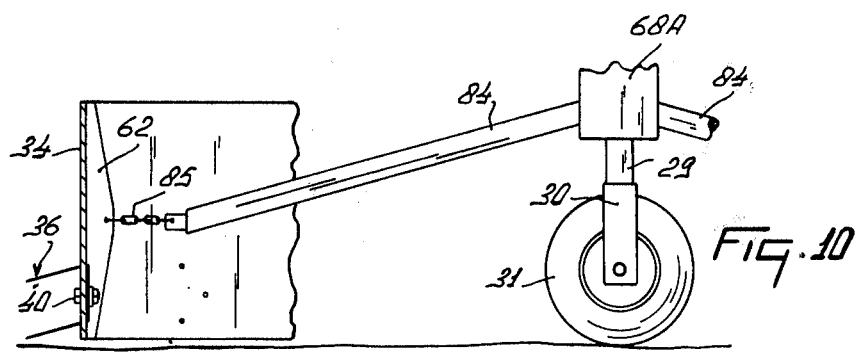
FIG. 10 is a of a second embodiment of the associated rake member.

In the embodiment of a rake member 76 shown in FIG. 10 the spokes are not at right angles to the rotary shaft; from the hub 68A they extend radially, viewed on plan. From the hub they extend downwards and are at an angle of about 30° to a plane at right angles to the rotary shaft 75. To the outermost end of each spoke 84 is fastened a flexible tensile member, for example, a chain 85, the other end of which is fastened in a similar manner to a stiffening strip 62 of the wall 34. The further structure of the wall 34, the stiffening strips 62 and the groups of tines 36 corresponds with that shown in FIG. 7. The rake member 76 is held in the manner described above by a supporting member, for example, a ground wheel 31, coupled with the rod 29 through a carrier 30.

The rake wheel 76 is driven through an auxiliary shaft linked to the power take-off shaft of the tractor 2 and to the input shaft of the gear box 68 so that the rake member 76 is rotated in the direction E. The tines of the groups 36 are again in dragging positions viewed in the direction of rotation E. Since the diameter of the rake member 76 hardly exceeds or does not exceed the width of the tractor, the length of the spoke 77 or 84 may be greater than in the case of a plurality of rake members. Viewed in a direction parallel to the direction of rotation 75 the length of a spoke 77 or 84 is about 75 to 85 percent of the radius of the wall 34, which is cylindrical in operation. The comparatively short, flexible connection between the spokes and the wall, which connection is required for obtaining the flexibility of the wall 34 as a whole as described above, is obtained by means of the links 80 or chains 85. When the rotation of the rake member 76 is stopped and the machine is lifted by means of the lifting device of the tractor 2, the flexible connections (links 80, chains 85) will hang down from the ends of the spokes so that the wall 34 folds up. For transport purposes it is only necessary to pivot upwardly the swath board 25 through 180° around the pivotal shaft 21, viewed on plan, is located inside the circumference of the rake member, the construction of the swath board will not increase the width of the machine in transport. The extension arms 79 are arranged not only at the ends of the spokes 77 but also in between two spokes on the felly 78. Thanks to the felly 78 the flexible wall 34 can be supported at many places along the circumference without the need for using a large number of spokes 77. The comparative lengths of the flexible connections formed by the links 80 and the chains 85 contribute to the stability of the wall 34 in operation, viewed in the direction of rotation. The driving torque of the rake member is transferred in a stable manner to the wall 34 via the smaller number of horizontally rigid spokes 77, while the felly 78 contributes to an increase in the rotational inertia of the rake member 76 so that a uniform circumferential speed is ensured. This remark relative to the felly 78 also applies to its potential use in the embodiment shown in FIG. 10.

The flexible connections between the hub 28 and the wall 34 in the embodiments shown in FIGS. 2, 5 and 6 are bent over to some extent in a tangential direction by the driving torque in operation, though a uniform circumferential speed is nevertheless obtained. These embodiments provide to the wall excellent possibilities of deflection in an axial direction.

The hay-making machine shown in FIG. 11 comprises a frame 86, in which a rake member 87 is journalled so as to be rotatable about an upright rotary shaft 88, which extends upwardly and forwardly, viewed in the direction of movement F, or which extends substantially vertically in operation in dependence upon the structural features of the rake member 87 and/or the nature of the crop to be displaced. The frame 86 comprises a trestle 89 in the form of an inverted U, viewed in the direction of movement F. The two free ends of the trestle 89 on the lower side are provided with fastening means 90 for the attachment to the lower arms of the lift of a tractor moving the machine and near the top of the trestle 89 fastening means 91 are provided for the attachment to the top arm of the three-point lift of the tractor. Away from the free ends of the trestle 89 supporting tubes 92 extend to the rear, the relative disposition, viewed on plan, being such that they converge to the rear. Together with the trestle 89 these supporting tubes 92 constitute an isosceles triangle (see the elevation of FIG. 11), the base of which is tranverse of the direction of movement F at the front of the machine. The rear ends of the two supporting tubes 92 are secured to a gear box 93 accommodating the rotary shaft of the rake member 87 and from a spot on the trestle 89 near the fastening means 91 a supporting tube 94 is inclined downwardly and rearwardly, the rear end of said supporting tube 94 being also secured to the gear box 93. As shown in FIG. 11, the center line of the supporting tube 94 coincides with the perpendicular of said triangle in the direction of movement F.

The geometrical rotary axis 85 is the center line of a shaft which is stationary to the frame 86 and ground wheels 98 are arranged beneath the rake member on the lower side of said stationary shaft in mirror-reflection fashion. These ground wheels are arranged one on each side of a vertical longitudinal plane of symmetry of the machine in the direction of movement F, the ground contact points in operation being located in front of a vertical plane at right angles to the direction of movement F and going through the point of intersection of the rotary shaft 88 with the ground.

The ground wheels 98 are adjustable in a direction of height in known manner (not shown). Owing to this adjustability in a direction of height the slope of the rake member 87 to the ground surface can be varied and fixed.

The rake member 87 of the machine shown in FIGS. 11 to 13 comprises a flexible wall 34, for example, of cloth, rubber or synthetic resin, which may be reinforced, the lower edge portion of this uninterrupted, closed wall extending down to the ground surface so that a crop-displacing member is formed, the lower part of which is capable of matching unevennesses of the ground in an extremely smooth manner in a radial, an axial and a tangential direction. The crop lying on the ground in the form of a layer or a swath is moved forwardly and displaced at the same time in the direction of rotation G by the rake member travelling in the direction F and rotating in the direction G by means of said flexible wall to an area on the left-hand side of the rake member (see FIG. 11), where the crop leaves the wall and is deposited in the form of a swath. In this embodiment the wall is folded in part of its circumferential extent and stretched taut over the further part of its circumference. For this purpose the rake member is constructed as follows.

The flexible wall is suspended at its top side by an uninterrupted supporting member 99, which is fastened by spokes 100 to the hub of the rake member 87. The spokes 100 are rigidly secured to a hub portion adapted to pivot about the rotary shaft and to be fixed in a plurality of positions. The spokes 100 and the supporting member 99 will, therefore, not rotate in operation. The supporting member 99, which is substantial annular when viewed on plan, is built up from two adjacent profiles imparting to the supporting member in a radial direction a substantially U-shaped section, an uninterrupted opening being left in the center of the U-shaped section for passing the fastening means to which the flexible wall 34 is suspended. The limbs of the U extend upwardly and the distance between them, measured in a radial direction, has two different values (FIGS. 11, 12). Over approximately half the circumference of the supporting member 99 the distance between the upright limbs of the U-shaped section of the supporting member 99 is approximately equal to 12 to 20 percent of the radius of the rake member 87, whereas over the other half of the circumference of the rake member said distance is equal to, for example, about 3 to 5 percent of the radius of the rake member. The wide portion of the supporting member 99 is located nearer the front of the machine and partly on the right-hand side thereof, whereas the narrow portion of the supporting member is located near the rear side and partly on the left-hand side, at least in the disposition shown in FIG. 11. Since as stated above the U-shaped section is open between the two limbs, the supporting member may be considered to consist of two coaxial angle-section profiles 101, 102 and 103, 102 respectively (FIG. 12), one flange of the profile 101 and a flange of the profile 102 (or 103, 102 respectively) being parallel to the rotary shaft 88, said flanges forming the said upright limbs of the U-shaped section. The space between the angle-section profiles 101, 102 and 103, 102 respectively is open (FIG. 12) so that the profiles 102 to 103 have to be fastened in a manner not shown at the top sides of their upright flanges (limbs) to the ends of the spokes 100 remote from the gear box 93. The supporting member 99 may, if desired, be completely closed on the top side in order to prevent penetration of dust and soil.

The space between the angle-section profiles 101 to 103 accommodates a chain 104 formed by a large number of links 105, which are relatively pivotable about pivotal shafts 106 extending parallel to the rotary shaft of the rake member 87 (FIG. 12). A roller 107 is freely rotatable about each pivotal shaft 106 between two links 105. The rollers 107 bear either on the top sides of the horizontal flanges of the angle-section profiles 102 and 103 and are radially guided by the upright flanges of said profiles or they bear on one of the horizontal flanges of the profiles 101 and 102 and are guided in a radial direction by the upright flange of the profile 101 or 102 respectively. The wall 34 is suspended by means of supporting members (not shown), for example, steel rods having eyelets at both ends, to the lower sides of all pivotal shafts 106, the suspension members passing through the gap between the adjacent angle-section profiles 101, 102 and 103, 102 respectively in downward direction.

As shown in FIG. 11, viewed in the direction of movement F and in the direction of rotation G, a driving device 108 is arranged near the right-hand side and the rear side of the rake member. For this purpose the angle section profile 103 and the angle-section profile 101 terminating at a distance from the former are locally prolonged inwardly to form a supporting member 109 extending mainly in a radial direction. The supporting member 109 comprises two tangentially spaced, upright flanges 110 and 111, interconnected on the lower side by a plate 112, which is integral with said flanges and which is parallel to a plane at right angles to the rotary shaft of the rake member. The flange 110 joins the upright flange of the angle-section profile 103 near the circumference of the rake member and the flange 111 joins the upright flange of the angle-section profile 101. The flanges 110 and 111 are spaced apart near the center part of the rake member and extend in this area approximately parallel to one another, whereas near the supporting member 99 they widen so that they diverge outwardly and join the supporting member 99 in the manner described above. Inside this widened part a driving wheel 113 is journalled in the plate 112 and adapted to rotate about a rotary shaft 114, which is parallel to the rotary shaft of the rake member 87. The driving wheel 113 is provided with a plurality of outwardly projecting tooth-like extensions 115 — in this embodiment, six — which are shaped so that they can engage the adjacent links 105 of the chain 104. For this purpose each link is formed by two superjacent strips interconnected at both ends by pivotal shafts 106. The distance between the two strips of each link 105 is such that an extension 115 of the driving wheel 113 can pass in between them so that it exerts pressure on the associated pivotal shaft 106, the chain 104 being thus moved in the direction of rotation G.

From FIG. 11 it will be apparent that a setting strip 116 is rigidly secured to the machine frame coaxially to the rotary shaft of the member 87, said strip having a plurality of holes 117. At the same radial distance from the rotary shaft of the rake member 87 the plate 112 of the supporting member 109 has a hole. As stated above, the spokes 100 and the supporting member 99 are adapted to turn about the rotary shaft of the rake member. By passing a locking pin 118 through one of the holes 117 and through the hole in the plate 112 the assembly of the spokes 100 and the supporting member 99 can be adjusted and fixed in various positions with respect to the machine frame. The gear box 93 comprises a driving wheel (not shown) which is drivingly connected with the input shaft 93A and which is adapted to rotate about the rotary shaft of the rake member 87. The rotary shaft 114 of the driving wheel 113 is furthermore provided with a wheel 119. The latter can be driven by means of a chain 120 (FIG. 12) by the driving wheel mentioned above. In order to obtain folds across the entire height of the wall under any condition a second guide member 101 to 103 and a second driving wheel 113 rotatable by the shaft 114 may be arranged at a comparatively small distance above the lower side of the wall, where the wall is fastened to the outer side of chain links.

FIG. 13 shows that the flexible wall 34 is provided on its outer side with a comparatively large number of outwardly projecting tines or groups of tines 36 in dragging positions with respect to the direction of rotation G parallel to a plane which is at an angle of about 30° to a tangential plane to the wall 34 at the area of the tine fastening. The group of tines 36 is fastened so that the last-mentioned angle is maintained under any condition of operation. In operation the machine is attached by the fastening means 90 and 91 to the lifting device of a tractor moving the machine and the input shaft 93A is drivingly connected by an auxiliary shaft with the power take-off shaft of the tractor. The driving wheel driven around the rotary shaft 88 of the rake member 87 drives by means of the chain 120 and the wheel 119 of the wheel 113 provided with the extensions. Since one of the extensions 115 exerts pressure on one of the pivotal shafts 106 of the chain 104 (as the case may be, on the roller 107 rotatable about the pivotal shaft 106), the chain 104 is driven in the direction of rotation G.

The exploded length of the chain 104, measured along the links 105, and the exploded length (the length of the wall 34 measured along the surface of the wall 34) exceed the circumference of the supporting member 99. When the chain 104 is driven by the driving wheel 113, it is, therefore, compelled to fold over at least part of the circumference of the supporting member 99 in order to eliminate said difference in length. Folding is allowed in the region of the supporting member 99 limited by the angle-section profiles 101 and 102 whose radial distance, as stated above, is fairly large. As a result the links 105 fold up to some extent in said region as shown schematically in FIG. 11 and in detail in FIG. 12. Owing to this partial folding of the links 105 the flexible wall 34 will also fold up, since the upper edge of the wall 34 is suspended to the lower sides of the pivotal shafts 106. The zigzag line (broken line) in FIG. 11 is, therefore, characteristic not only of the shape of the chain 104 but also of the shape of the folded wall 34 in this region. Near the reference numeral 121 (FIG. 11) the trajectory limited by the angle-section profiles 101 and 102, where the chain 204 folds up, terminates in a narrowed part of smooth shape in the direction of rotation G, after which the supporting member reassumes the shape and the dimensions shown in FIG. 12 in the disposition of the angle-section profiles 102 and 103. Owing to the drive by the driving wheel 113 the chain is stretched in the "narrow" region of the supporting member 99 between the angle-section profiles 102 and 103 and after having passed the driving wheel 113 the chain is pushed on so that it folds as well as the wall 34 suspended to the chain. The wall 34 therefore has a corrugated shape near its lower side and (FIG. 11) near its right-hand side and its front side. These corrugations include cavities in which the crop can be temporarily retained during the propagation and the rotation of the rake member. The crop held in these valleys is carried around by the wall 34 in the direction of rotation G and released at an area near the numeral 121 since the wall 34 is smoothed there by the stretching out of the chain 104, there being no probability for the crop to be carried further by the smooth wall portion. Consequently by the folds the wall itself can retain the crop to a great extent. If the wall 34 should not be capable of performing this function to the full extent under particular conditions or for certain kinds of crop, it is advantageous to arrange the tines or groups of tines 36 near the lower side of the wall (FIG. 13). These tines or groups of tines 36 then contribute to a high extent to the engagement of the crop, which not only sticks to the tines but also remains in the folds of the wall 34 so that a very large pick-up capacity is obtained. When the wall 34 is stretched near the region 121, the crop is urged out of the folds and, moreover, the tines extending substantially radially in the folding region of the wall are automatically changed over to a strongly dragging position by the stretching of the wall so that also the crop sticking to the tines is ejected. In this manner the hay-making machine comprises a flexible wall forming automatically unevennesses (folds, tines), which carry the crop along, while at the desired area the wall can be moved into a state suitable for releasing the crop. By inserting the locking pin into one of the further holes 117 the folding region of the wall 34 and the area of crop release may be varied, viewed in the direction of movement F, by turning the whole supporting member 99 about its rotary shaft and fixing it in the new position.

Figure 14:
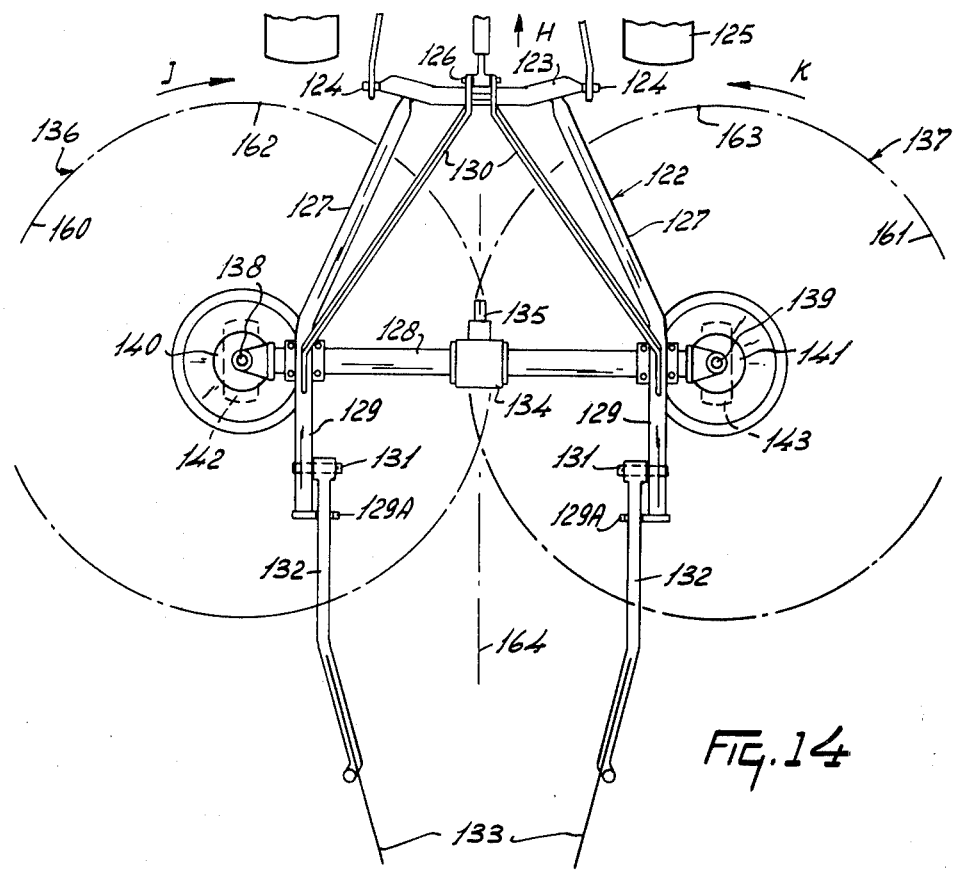
FIG. 14 is a plan view of a still further machine embodying the invention comprising two rake members.

In the embodiment shown in FIG. 14 the machine comprises a frame 122 having a trestle 123 in the form of an inverted U, fastening means 124 being provided near the two free ends of the trestle for attaching the machine to the lower arms of a tractor moving the machine. Near the top side of the trestle 123 fastening means 126 are provided for securing the machine to the top arm of the lift of the tractor. From the trestle 123 two supporting tubes 127 are arranged symmetrically to the vertical plane of symmetry of the machine in the direction of travel H and diverge rearwardly (see FIG. 14). At a distance from the trestle 123 they are fastened near the end of a frame beam 128 extending transversely of the direction of travel H. The supporting tubes 127 are bent near the frame 128 in a direction parallel to the direction of travel H and project behind the frame beam 128 to form supports 129. From the top side of the trestle 123 supporting strips 130 also extend in symmetrical fashion so as to diverge rearwardly; near the fastening points of the supporting tubes 127 said strips are also secured to the frame beam 128. At a distance in front of the rear end of each of the supports 129 a horizontal pivotal shaft 131 extends transversely of the direction of movement H, a support 132 extending to the rear being pivotally connected to each of said shafts. At the rear the support 132 is provided with a swath board 133. Each of the two swath boards 133 comprise a plurality of rearwardly freely extending spring steel rods and the two swath boards converge in operation in a direction opposite the direction of movement H. The swath boards 133 glide by their lower sides in operation along the ground and turn up and down about the associated pivotal shafts 131. On the rear side of each of the supports 129 a support 129 A extends transversely of the direction of movement H and is provided on the top side with a recess for receiving the associated support 132, when the machine is lifted by the tractor 125. The swath boards 133 can be tilted up about the associated pivotal shafts 131 through an angle of about 180° to deposit the swath boards on the frame 122. This tilted-up position is suitable for transport and for tedding crop. At the center of the frame bear 128 a gear box 134 comprises an input shaft 135. The gear box 134 comprises two output shafts journalled in the hollow frame beam 128 for driving two rake members 136 and 137. These rake members are rotatably journalled on rotary shafts 138 and 139 respectively, journalled in gear boxes 140 and 141 respectively. The parallel rotary shafts 138 and 139 extend in operation approximately vertically or they are at an acute angle to the horizontal plane so that they are inclined upwardly and forwardly. The rake members 136 and 137 can be driven in opposite senses (J and K) and they can overlap one another partially. The machine is held on the ground by ground wheels 142 and 143, arranged beneath the rake members 136 and 137 respectively and adapted to be adjusted in a direction of height relative to the frame and to be fixed in a plurality of positions.

The rake members 136 and 137 are provided with a hub 144 and 145 respectively (FIG. 15) adapted to rotate about the rotary shaft 138 and 139 respectively. To each of the hubs 144 and 145 are secured radially projecting spokes 146, whose ends remote from the associated hub hold an annular felly 147. At equal intervals along the circumferences of the two fellies 147 groups of tines 148 are arranged at a relative distance, measured along the circumference such that the space between two corresponding points of two adjacent groups of tines is smaller than the length of the active portion of one of the groups of tines. Each group of tines 148 is journalled in the associated felly so as to be pivotable with a pivotal shaft 149, which preferably extends parallel to the associated rotary shaft 138 and 139 respectively (FIGS. 15 to 17). For this purpose the felly 147 comprises at several places a sleeve 150 (FIG. 17) having a bore for passing the associated pivotal shaft 149. The lower portion of the pivotal shaft 149 extends down to a small distance from the ground and is provided near this and with two tines 151 and 152 of spring steel wire. The portion of the pivotal shaft 149 projecting above the sleeve 150 and the felly 147 is bent through 90° to form a crank 153 (FIGS. 16 and 17). The end of the crank 153 remote from the upwardly extending portion of the pivotal shaft 149 is bent upwardly through 90° to form an end portion 154 (FIG. 17), which extends parallel the pivotal shaft 149 and is provided near its free end with a roller 155. The roller 155 is freely rotatable about the end portion 154 and may be provided at its periphery with a resilient, cylindrical surface layer, for example, of rubber. Viewed in a direction parallel to the pivotal shaft 149 the group of tines 148 is at an angle to the crank 153. The center of gravity of the portions 149, 151, 152, 153, 154 and 155 has a position such that, viewed in the direction of rotation J or K it is located behind a plane going through the rotary shaft 138 or 139 respectively and the associated pivotal shaft 149. Near each group of tines 148 the felly 147 is provided with a stop 153 at an area such that when said series of portions turn in the direction J (FIGS. 15 and 16) the crank 153 comes into contact with the associated stop 156. The place of the stop is chosen so that when the crank 153 abuts against the stop 156, the tines 151 and 152, located one above the other, extend outwardly and preferably in a radial direction or a forwardly inclined position.

Each felly 147 is furthermore provided with holders 157 (FIGS. 15 and 16) arranged, viewed in the direction of the rotary shafts 138 and 139, between each pair of adjacent groups of tines 148 or sleeves 150 on the fellies 147. Through each holder 157 is passed a spring steel rod 158 extending at right angles to the associated rotary shaft 138 and 139 respectively, the rod being orientated outwardly away from the associated felly 147. The length of the rod portion 158 projecting beyond the associated felly 147 is such that, when the rake members are rotated in the directions J and K, each rod 158 of one of the rake members will come into contact with a roller 155 of a group of tines 148 of the other rake member. Each holder 157 is pivotable with respect to the associated felly 147 about a pivotal shaft 159 and fixable in a plurality of positions. Each pivotal shaft 159 is parallel to the associated rotary shaft 138.

The devices shown in FIGS. 14 to 17 operate as follows. During the operation of hay-making machines of the kind shown in FIG. 14 it frequently occurs that crop picked up by the rake members 136 and 137 near the points 160 and 161 (FIG. 14) of the paths of the tines is prematurely released from the tines so that it leaves the rake members 136 and 137 for example already at the points 162 and 163 (FIG. 14) and crop emanating from the rake member 136 is thrown into the rake member 137 which results in an incorrect spreading of the crop or in a state in which all the crop cannot be collected in a swath. This may be due to the fact that, viewed in an axial direction, the groups of tines are often in slightly dragging positions for delivering the crop in the form of a swath, in which dragging position the crop may glide off prematurely. This phenomenon may occur with radially extending tines so that tedding is not performed in the desirable manner. In order to solve this problem a vertical guide surface is often used in practice, said surface extending in the direction of travel and located in the plane of symmetry 164 (FIGS. 14 and 15) in front of the frame beam 128 (viewed in the direction of travel H). In order to avoid such complicated structures the tines are preferably arranged in forwardly inclined positions (shooting positions) in accordance with the invention, which means that viewed in the direction of rotation J or K the tines are pointed forwardly. In this position of the tines is a minimum probability for the crop picked up near the points 160 and 161 to leave the tines prematurely. In this position the groups of tines carry the crop along over comparatively long distances. In this embodiment said position of the tines is obtained by the choice of the area of the stops 156 so that the groups of tines 148 are in shooting positions when the associated crank 153 comes into contact with the stop 156. In operation the crank 153 will, in general, be in contact with the associated stop 156 because the center of gravity of the group of tines 148, the pivotal shaft 149, the crank 153, the end portion 154 and the roller 155, viewed in a radial direction and in the direction of rotation J or K, is located behind a radial plane going through the pivotal shaft 149 so that the centifugal force urges the crank 153 against the stop 156. As a matter of course, the stops 156 may be adjustable and fixable in a plurality of positions, if desired, simultaneously.

Since the groups of tines 148 are freely pivotable with the associated pivotal shafts 149, it would of course be possible to fasten an elastic bar at the desired area to the frame beam 128 so as to project downwardly over a length such that this bar can contact all groups of tines 148 of one of the rake members 146 or 147 so that the groups of tines would pivot rearwardly in a direction opposite the arrow L in FIG. 16 by the collision, so that the tines would be transiently in a dragging position and the crop is so to say compelled to leave the group of tines. However, with this solution very heavy collision forces are produced because the difference in speed between the actuating member and the actuated member is comparatively great, which involves the risk of breakage, while a high amount of noise is produced. The solution illustrated in FIGS. 15 to 17 involves a construction in which said speed difference between the actuating member and the actuated member (groups of tines) is very slight. This solution is based on the following kinetic effect.

FIG. 15 shows one of the bars 158 fastened to the rake member 137 in a position at right angles to the vertical longitudinal plane of symmetry of the machine 164, viewed in a direction parallel to the rotary shafts 138 and 139 respectively. The point 165 of the rod 158, which is located in the position shown also in the plane of symmetry 164, will have, when rotating about the rotary shaft 139, a given speed component located in the plane of symmetry 164 opposite the direction of travel H. A point 166 of the rod 158 is at a greater distance from the associated rotary shaft 139 than the point 165 will also have a speed component parallel to the plane of symmetry 164 (as a matter of course also opposite the direction of travel H) the latter component, however, slightly exceeding that of the point 165. The smaller the distance between the points 165 and 166, the smaller will be the difference between said speed components parallel to the plane of symmetry 164. The difference between said speed components of the points of the rod 158 concerned located near the felly 147 of the rake member 137, to which the rod 158 is fastened, and of the points of the same rod 158 located near the felly 147 of the other rake member 136 (see FIG. 15) will, therefore, be fairly small. This discrepancy of the speed components in the direction of the plane of symmetry 164 is utilized for turning the groups of tines 148. It should be noted that the smallest distance between the fellies 147 of the two rake members are compared with the distance between the rotary shafts 138 and 139 is shown considerably exaggerated on account of drawing techniques. FIG. 16 shows the position in which one of the rods 158 of the rake member 137 is in contact with a roller 155 of a group of tines 148 of the rake member 136. Since the speed component of the end of this rod 158 parallel to the longitudinal plane of symmetry 164 is slightly greater than the speed component of the roller 155 measured in the same direction (which is at a slightly smaller distance from the associated rotary shaft 138), the rod 158 will turn the associated group of tines 148 of the rake member 136 with a comparatively slight speed about the associated pivotal shaft 139 in a direction opposite the arrow. The extent of this pivotal movement depends, of course, on the proportions used. Owing to the collision with the rod 158 the group of tines concerned is turned so that the tines may arrive at a strongly dragging position so that the crop is compelled to leave the tines. When the rake members continue rotating, the roller will shift outwardly along the rod 158 until finally the rod 158 can slide off along the outer side of the roller, viewed in the direction of rotation (see the position shown in FIG. 15). By a correct choice of the length of the spring steel rods 158 and by a pivotal adjustment can be performed by turning the associated holder 157 about the pivotal shaft 159, the area of contact between the roller 155 and hence the area of the pivotal movement of a group of tines 158 may be adjusted at will along the circumference of the rake member concerned.

Recapitulating, it should be noted that the groups of tines of one rake member are controlled by control-means fastened to the other rake member. The collision between a rod 158 and the roller 155 is little intensive owing to the aforesaid kinetic ratios and the intensity of this collision is further reduced by the resilience of the spring steel rods 158, while the roller 155 is surrounded by a resilient layer. After a rod 158 has left the corresponding roller 155 of the other rake member upon the further rotation of the rake member, the group of tines 148 automatically returns to the (for example shooting) position determined by the stop 156 owing to the centrifugal force acting at the center of gravity of the assembly concerned. Upon further rotation of the rake member the group of tines will again pick up crop near the points 160 and 161 respectively (FIG. 14) and owing to the radial or shooting position of the tines the crop will not leave them prior to the place where the groups of tines are turned by means of the rods 158. As a matter of couse the rods 158 are fastened to the two rake members 136 and 137 and each group of rods controls the groups of tines of the other rake member. A structure in which the tines 151 and 152 of adjacent rake members 136 and 137 overlap one another can be used when the points of contact between rods 158 and rollers 155 take place near the plane of symmetry 164. In the latter case it may be advantageous for the cranks 153, when the groups of tines are not turned, to be inclined outwardly to the rear, viewed in the direction of rotation instead of extending tangentially so that the control-rollers 155 are close to the plane of symmetry 164.

In the embodiment shown in FIGS. 18 and 19 the spokes 100 of the rake member 87 are fastened to a hub 168, which is rotatable about the rotary shaft 88. A supporting ring 169, which is angular in section and circular viewed on plan, is arranged at the ends of the spokes 100 remote from the hub. Viewed in a radial direction (see FIG. 18) the supporting ring 159 is provided on the lower edge of the vertical leg with a plurality of notches so that a series of supporting faces 170 integral with the supporting ring 160 exist between said notches. Viewed in a radial direction, a plurality of means 171 are arranged at the area of the supporting faces 170, each means being formed by an elongated strip 172 of rectangular section, the long side of which extends in an axial direction. Each plate-strip 172 is made of fairly thin sheet material, for example, steel, aluminum or synthetic resin. In the no-load state each strip 172 has an arcuated surface. The upper part 173 of each strip 172 is flat and engages the ring 169 or the corresponding supporting face 170 and by means of a bolt or a nail 174 it is rigidly secured to the supporting ring 169. The portion 175 of the strip 172 located beneath the supporting ring 169.or the supporting face 170 is also flat, but this surface is parallel to a plane at an angle to the plane to which the upper portion 173 of the same plate-strip 172 is parallel. The arcuation of the strip 172 obtained by depressing the material is located near the lower side of the corresponding supporting face 170. The extent of arcuation of each plate-strip 172 is shown in FIG. 18. Viewed in the direction of rotation, the lower portion 175 is in a dragging position, but as an alternative, this position may be substantially or wholly radial. To the lower portion 175 of each strip 172 is fastened an eyelet 176 at an area located on the rear side of the portion 175, viewed in the direction of rotation, that is to say, behind a plane going through the center line of the bolt or nail 174 and through the rotary shaft 88. To each eyelet 176 is secured a control-wire 177 whose end remote from the strip 172 is rigidly secured to the hub 168. The flexible control-wires 177 (for example steel wire or nylon rope) extend parallel to a plane at right angles to the rotary shaft 88. To the stationary rotary shaft 88 is fastened a radial extension arm 178 whose end remote from the rotary shaft 88 is located, viewed in an axial direction, at a place situated approximately midway the rotary the rotary shaft 88 and the supporting ring 169. To this end of the extension arm 178 is fastened a support 179 extending in a tangential direction and having near its free end a rotatable control-roller 180. The rotary axis of the freely rotatable control-roller 180 extends radially and at right angles to the rotary shaft 88. Viewed in upward direction parallel to the rotary shaft 88 the upper points of the control-roller 180 are located at a higher level than the proximate portions of the control-wires 177, viewed in a radial direction. The rotary axis of the control-roller 180 is adjustable in a tangential and an axial direction in a manner not shown and can be fixed in a plurality of positions.

The hay-making machine shown in FIGS. 18 and 19 operates as follows. The means 171 constitute an endless sequence of consecutive crop-displacing members arranged at a relative distance such that the space measured between two corresponding points of two adjacent means along the circumference is smaller than the length of the active portion of one of said means, the active portion being considered to be that portion of the strips 172 which projects below the lower edge of the corresponding supporting face 170. The lower edge portions of the strips 172 move at a small distance above the ground and are capable of deforming elastically, when encountering unevennesses of the ground, while they can immediately thereafter re-assume their initial position. The means 171 are capable of elastically matching the unevennesses of the ground in a radial, an axial and a tangential direction. The strips 172 engage the crop layer on one side and push the crop accumulated in front of the strips occupying dragging positions forward and in a tangential direction towards the other side of the rake member. Owing to the aforesaid small distance between the strips the crop cannot move past between these strips, even in their dragging positions and it will stick in the cavities in front of these strips up to the point where the crop is released on one side of the machine. The control-roller 180 serves to further this discharge, if necessary. The control-roller 180 is, therefore, arranged at such an area viewed in the direction of travel that this spot is determinative of the place of discharge. Since the upper points of the control-roller 180 are located in an axial direction at a higher level than the control-wires 177, each control-wire 177 will be urged upwards when passing the control-roller 180. When one of the control-wires 177 comes into contact with the top side of the control-roller 180, this portion of the control-wire 177 moves upwards so that the rectilinear distance between the contact points of the control-wire 177 is shortened, since the shape of the wire 177 deviates from a straight line. This is possible by the shift of the eyelet 176 and by the torsion of the lower portion 175 of the strip 172, as is indicated at one of the strips 172 in FIGS. 18 and 19, while viewed in an axial direction the lower portion of the plate-strip 172 will temporarily occupy a tangential position so that the crop is released. Since the arcuated shape of the plate-strip 172 in the no-load state is the normal shape, the plate-strip 172 will leap back into its normal state after having passed by the control-roller 180 so that the lower portion 175 is again in the dragging position.

In the embodiment shown in FIG. 20 an ejecting member 181 is provided for delivering the crop at an adjustable location along the circumference of the rake member 87; in this case the crop is blown off. In this embodiment the rake member 87 is provided along the circumference of the supporting ring 169 with a large number of crop-displacing means, for example, spring steel tines 183. A hub 182, similar to the coaxial hub to which the spokes 140 are secured, extends beneath the plane of rotation of said spokes in downward direction and provided on the outer circumference with a plurality of curved blades 184, which have in operation the same speed of rotation as the rake member 87 itself. The free ends of the blades 184 of equal lengths describe a circle parallel to the rotary shaft 88. Around the blades 184 is arranged a so-called pump-shell housing 185 comprising a housing 185 in the form of part of a cylindrical sheath, the axis of symmetry of which is eccentric to the rotary shaft 88 but parallel to said rotary shaft. The ends of the housing 186 terminate in an exhaust channel 187 having walls converging towards the circumference of the rake member 87 and forming at their ends an exhaust opening 188, whose plane extends tangentially with respect to the circumference of the rake member 87. Near the exhaust opening 188 a controllable throttle valve 189 is included in the exhaust channel 187 and is adjustable about an axial pivotal shaft in various positions, in which it can be fixed. For the further shape of the ejecting member 181 reference is made to FIG. 20. The parts shown in said Figure are closed on the bottom and top sides by walls extending parallel to a plane at right angles to the rotary shaft 88, one of said walls, preferably the top wall being provided with one or more openings located near the rotary shaft 88 for the supply of air to the interior of the shell housing 185. The whole ejecting member 181 is adapted to turn about the rotary shaft 88 and to be fixed in a plurality of positions by means of a tag 190 fastened to the housing 186 and having a hole 191. To a portion of the stationary rotary shaft located beneath the ejecting member 181 is fastened a curved setting strip 192 bent around the axis of symmetry of the housing part 186 as shown in FIG. 20, said strip having a plurality of holes 193. The exhaust opening 188 may be adjusted in various positions relative to the circumference of the rake member 87, viewed in a tangential direction, and may be fixed in position by inserting a locking pin into the hole 191 and one of the holes 193 of the strip 192.

In operation the blades 184 rotate with a speed equal to that of the rake member 87, but in principle it is of course possible to increase this speed with respect to that of the rake member 87 with the aid of a gear wheel transmission (not shown). In this embodiment the air entering the housing 186 from the top side of the ejecting member 181 is blown at a high rate by the blades 184 through the exhaust channel 187, the air escaping through the exhaust opening 188, which is located quite near the inner side of the circumference of the rake member 87. The crop hanging on the means 183 is blown off said means at the area of the exhaust opening 188 by the high-speed air stream. It is thus ensured that the crop is thrown off at a predetermined spot along the circumference of the rake member, even if the end portions of the means extend in a radial direction or in a shooting position. By adjusting the throttle valve 189 the speed of the emerging air stream can be regulated or the air supply can be completely cut off, if desired.

Figure 21:
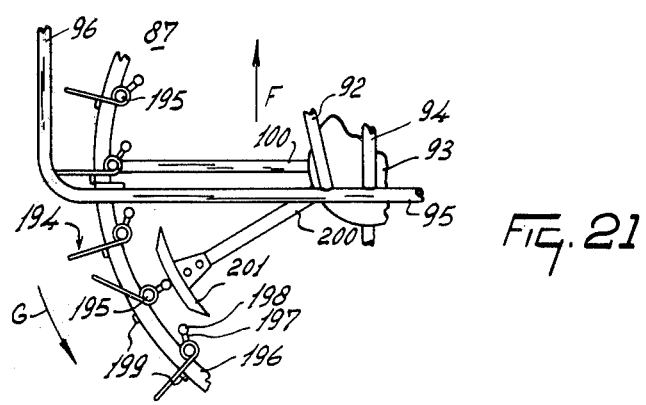
FIG. 21 is a plan view of part of the circumference of a rake member of the machine embodying the invention in a further example.

FIG. 21 shows part of the machine comprising a large number of groups of tines 194, which are freely pivotable about substantially axial pivotal shafts 195, which are journalled in a felly 196 of annular shape. The felly 196 is connected by spokes with the rotatable portion of the hub of the rake member. Each group of tines 194 is shaped and proportioned so that, viewed in a radial direction, the center of gravity of the group of tines is located on one side of the pivotal shaft 195, that is to say on that side which, viewed in the direction of rotation G, is located behind the pivotal shaft 195. For this purpose the spring steel tines of each group 194, which are freely rotatable by means of coils about the associated pivotal shaft 195, are provided with a prolongation 197, which is at an angle of about 90° to 130° to the direction of the tines (FIG. 21). To the free ends of the prolongation 197 may be secured, if desired, a mass 198 which determines the position of the center of gravity of the group of tines 194 in the manner described above. At a distance from each pivotal shaft 195 and at a place at a greater distance from the rotary shaft of the rake member 87 a felly 196 is provided with a stop 199, which is located so that when a group of tines 194 is in contact with this stop 199 this group is in a radial or even shooting position, which applies to all groups of tines, at least in principle. To the stationary part of the hub of the rake member 87 is secured an extension arm 200, which is tangentially adjustable and fixable in a plurality of positions. Near the free end of the extension arm 200, which end is parallel to the rotary shaft of the rake member 87 inside the felly 196 an elongated, substantially bar-shaped magnet 201 is provided, which has a curved shape, viewed in an axial direction and is coaxial to the felly 196. The location of the rod-shaped magnet 201 is such that its outer surface which is coaxial to the rotary shaft passes at a comparatively short distance from the point of the mass 198 furthest remote from the pivotal shaft 195 when, viewed in an axial direction, the line of connection between said mass and the pivotal shaft 195 extends radially. The magnet 201 may be a permanent magnet, but it may consist of electrically magnetizable material.

Since in operation the center of gravity of the group of tines 194, viewed in the direction of travel G, and viewed in a radial direction, is located behind the associated pivotal shaft 195, the mass 198 tends to move outwardly under the action of centrifugal force so that the tines of the group 194 turn until they come into contact with the associated stop 199. The group of tines is fixed in this predetermined position by centrifugal force. In a radial or slightly inclined position the crop is carried along over a comparatively large distance, while there is little probability for the crop being released from the rake member 87 prior to the point where the magnet 201 is disposed. When a group of tine 194 approaches the magnet 201 in the direction of rotation G, the mass 198 consisting of magnetizable substance will be attracted by the magnet 201 so that the group of tines will turn around the pivotal shaft 195, the prolongtation 197 then occupying substantially a radial position. The groups of tines thus turns automatically into a dragging position so that the crop is released at the place of the magnet 201. It is thus possible to pick up the crop by radial or shooting tines, while the crop can be released with certainty at a predetermined area so that premature or retarded delivery of crop are avoided. When the magnet 201 is removed, the machine will operate as a tedder. Even if the machine is subject to soiling, the regulating function of the magnet is maintained.

What is claimed is:

1. A machine for raking and displacing crop lying on the ground comprising a frame and at least one rake member supported by said frame, said rake member being rotatable about an upwardly extending axis and driving means connected to rotate said member, said member comprising a rotatable support with crop engaging means attached around the axis of rotation of said support, said crop engaging means being moved through a generally circular path during rotational operation of said member, said crop engaging means being displaceable and turnable on said support during rotation thereof, responsive to the influence of control means, said control means being fixed to said member adjacent and within the perimeter of said support and positioned to turn the crop engaging means sequentially and deposit crop therefrom during rotation of the rake member.

2. A machine as claimed in claim 1, wherein said crop engaging means comprises a magnetizable mass connected to at least one of said tines, a magnet being positioned adjacent said outer circumference to turn said mass and tine.

3. A machine as claimed in claim 1, wherein said crop engaging means includes tines secured to the lower portion of said wall and said tines are steered by the folding of the wall.

4. A machine as claimed in claim 1, wherein said support has an outer circumference defined by a flexible circular wall which is deflectable in at least one direction with respect to said axis of rotation, and said crop engaging means is fastened to the outer side of said wall.

5. A machine as claimed in claim 4, wherein said wall is pliable and comprised of flexible rubber, synthetic resin or canvas material.

6. A machine as claimed in claim 4, wherein said wall is deflectable in an axial direction.

7. A machine as claimed in claim 4, wherein said wall is deflectable in a radial direction.

8. A machine as claimed in claim 4, wherein said wall is deflectable in a tangential direction.

9. A machine as claimed in claim 4 wherein said crop-engaging means is comprised of tines arranged in groups.

10. A machine as claimed in claim 1, wherein the upper wall circumference, measured along the surface of the wall and parallel to a plane at right angles to said axis, is greater than the circumference of said raking member.

11. A machine as claimed in claim 1, wherein said crop engaging means are flexible strip-shaped tines and a steering member on the raking member is positioned to torsion the tines, said tines each being supported on said support and interconnected to a central portion of the rake member with flexible wire-shaped elements, said steering member comprising a roller on a rotary shaft that is fixed on the machine relative to said central portion and said roller being positioned to sequentially bear on said elements during every revolution of said raking member.

12. A machine as claimd in claim 1, wherein said raking member has a central portion and said driving device extends radially from said central portion to engage said links.

13. A machine as claimed in claim 12, wherein said guide means includes a wide portion and a narrow portion, said links having rollers that engage each said portion, whereby said links fold in the wide portion and stretch in said narrow portion during the rotation of said member.

14. A machine as claimed in claim 13, wherein the outer end of said driving device is a rotatable driving wheel that engages said links adjacent a junction of the wide and narrow portions, means for adjusting the location of said wheel and junction around the circumference of said member.

15. A machine for raking or displacing crop lying on the ground comprising a frame with guide means and at least one raking member supported by said frame rotatable about an upwardly extending axis, a driving device connected to rotate said member and said member having a crop engaging wall mounted on said guide means, said wall being generally circular and foldable, links mounted on said guide means, said links being engaged by the driving device and said links being driven around said guide means adjacent the circumference of the wall during operation, said device cooperating with the guide means to alternately stretch and fold said links and portions of said wall during operation.

16. A machine for raking and displacing crop lying on the ground comprising a frame and a pair of rake members supported side-by-side on said frame, said rake members being totatable about an upwardly extending axes and driving means connected to rotate said members in relative opposite directions, said members each comprising a rotatable support with tines pivoted to that support, said tines having crop working portions and being pivotable about respective upwardly extending pivot axes positioned on said support around the axis of rotation thereof, control means on each of said members located adjacent the corresponding supports and said tines being pivoted to a displaced position sequentially by said control means during the rotation of said member, the tines of one rake member being pivoted by the control means on the other member and vice versa, whereby crop engaged by said members is deposited in a preselected location with respect to said circumference.

17. A machine as claimed in claim 16, wherein said control means includes elongated rods that extend radially from the support means of each raking member.

18. A machine as claimed in claim 17, wherein said tines are mounted in assemblies and the center of gravity of each tine assembly is located so that the crop working portions thereof extend outwardly by centrifugal force during rotation, said assemblies each being mounted on a pivotal shaft on the support of its corresponding raking member.

19. A machine as claimed in claim 18, wherein a stop on said support is associated with each assembly and the positions of their crop working portions are limited by the stops.

20. A machine as claimed in claim 19, wherein each stop is displaceable with respect to its corresponding support.

21. A machine as claimd in claim 20, wherein each tine assembly includes at least one tine mounted on a crank arm which turns on a corresponding pivotal shaft on said support.

22. A machine as claimed in claim 21, wherein said assemblies of one member each comprise a contact surface that engages the control means of the other member during rotation.

23. A machine as claimed in claim 22, wherein the distance between the contact surfaces of said assemblies of one raking member and the axis of rotation of the other rake member is greater than the distance between the contact surfaces of the assemblies of said one member and the corresponding axis of rotation of said one member.

24. A machine as claimed in claim 23, wherein said tines are mounted in units on corresponding pivotal shafts that are journalled in respective sleeves held by a corresponding support.

25. A machine as claimed in claim 24, wherein said tine units are located below said support and said contact surfaces and respective crank arms are located above said support.

26. A machine as claimed in claim 18, wherein the working portions are generally inclined in a radial direction and away from their corresponding pivotal shafts to the front with respect to the normal direction of rotation of said raking members and at least in the crop engaging region.

27. A machine for raking or displacing crop lying on the ground comprising a frame and at least one raking member supported by said frame and rotatable about an upwardly extending axis, said raking member having an outer circumference and crop engaging tines located adjacent said circumference, ejecting means located adjacent said circumference to remove crop engaged by said tines in a direction outwardly with respect to the axis of rotation of said raking member, said raking member being driven about an upwardly extending shaft by driving means engaging said raking member, said ejecting means comprising a blower mounted on the raking member within said circumference and said blower having an outlet positioned to direct an air stream outwardly from the axis of rotation of said raking member, means adjusting said outlet around said axis of rotation to discharge crop at a preselected sector.

28. A machine as claimed in claim 27, wherein said blower comprises a fan mounted on said shaft and a housing that surrounds said shaft.

29. A machine as claimed in claim 28, wherein said fan can be driven to rotate at a speed faster than the rotational speed of said shaft.

30. A machine as claimed in claim 29, wherein said outlet is at the end of a channel of said housing and valve means mounted in said channel controls the volume of air discharge therefrom.

* * * * *